United States Patent [19]

Fuzii et al.

[11] Patent Number: 4,893,055

[45] Date of Patent: Jan. 9, 1990

[54] PROCESS FOR USING UNSATURATED POLYESTER RESIN COMPOSITION FOR TREATING CATHODE-RAY TUBES AND CATHODE TUBES OBTAINED THEREBY

[75] Inventors: Tadashi Fuzii, Hitachi; Hirohumi Izumi, Kitaibaraki; Etsuji Iwami; Kazuyuki Tanaka, both of Hitachi, all of Japan

[73] Assignee: Hitachi Chemical Co., Ltd., Tokyo, Japan

[21] Appl. No.: 118,160

[22] Filed: Nov. 9, 1987

Related U.S. Application Data

[62] Division of Ser. No. 817,668, Jan. 10, 1986, abandoned.

[30] Foreign Application Priority Data

Jan. 22, 1985 [JP]  Japan .................................. 60-10686
Jan. 24, 1985 [JP]  Japan .................................. 60-11278

[51] Int. Cl.$^4$ ........................ H01J 29/88; H01J 29/87
[52] U.S. Cl. .................................. 313/479; 313/477 R; 313/480; 220/2.1 A; 358/247; 428/437; 525/46; 525/48
[58] Field of Search .................... 313/2.1, 477 R, 479, 313/480; 220/2.1 A; 428/437; 358/247

[56] References Cited

U.S. PATENT DOCUMENTS

| | | | |
|---|---|---|---|
| 2,882,256 | 4/1959 | Waychoff | 525/48 |
| 2,939,854 | 6/1960 | Christenson . | |
| 3,160,679 | 12/1964 | Lew | 528/304 |
| 3,225,117 | 12/1965 | Harper | 525/48 |
| 3,549,478 | 12/1970 | Gillery | 220/2.1 A |
| 4,259,457 | 3/1981 | Login . | |
| 4,276,388 | 6/1981 | Iwami | 525/48 |
| 4,293,686 | 10/1981 | Gardner | 528/192 |
| 4,496,688 | 1/1985 | Hefner | 525/44 |

FOREIGN PATENT DOCUMENTS

| | | |
|---|---|---|
| 0089811 | 9/1983 | European Pat. Off. . |
| 2910857 | 7/1976 | Fed. Rep. of Germany . |
| 2295558 | 10/1979 | France . |
| 2561439 | 9/1985 | France . |

*Primary Examiner*—Patricia Short
*Attorney, Agent, or Firm*—Antonelli, Terry & Wands

[57] ABSTRACT

A resin composition obtained by adding maleic anhydride to an unsaturated polyester resin composition comprising (I) an unsaturated polyester, (II) a styrene monomer, and (III) at least one polymerizable unsaturated compound, in limited amounts is low in viscosity, excellent in transparency and adhesiveness, able to prevent the generation of surface defects, and thus suitable for treating cathode-ray tubes.

12 Claims, 1 Drawing Sheet

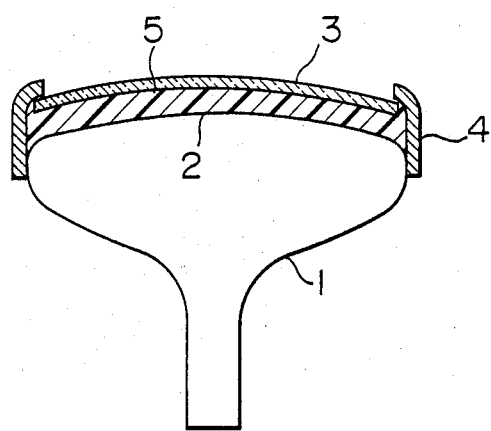

PROCESS FOR USING UNSATURATED POLYESTER RESIN COMPOSITION FOR TREATING CATHODE-RAY TUBES AND CATHODE TUBES OBTAINED THEREBY

This is a division of application Ser. No. 817,668 filed Jan. 10, 1986, now abandoned.

BACKGROUND OF THE INVENTION

This invention relates to an unsaturated polyester resin composition for treating cathode-ray tubes.

A method for adhering a cathode-ray tube and front glass to each other generally comprises, as shown in the attached drawing, surrounding and holding, in contiguity with a face-plate portion 2 of a cathode-ray tube 1, front glass 3 having the same curvature and substantially the same size as the face-plate portion 2 with a tape 4 at a very short distance from the face-plate portion, filling this gap with a resin composition 5 such as epoxy resin composition, unsaturated polyester resin composition or the like, and then curing the resin composition.

Conventional epoxy resin compositions and unsaturated polyester resin compositions for adhering a cathode-ray tube and front glass to each other have both merits and demerits, and in the existing circumstances, there has not yet been obtained any resin composition having both characteristics and workability which are satisfactory as those of the resin composition for adhering a cathode-ray tube and front glass to each other.

For example, when an epoxy resin composition is used, it has a high adhesive strength and hence is advantageous for adhering front glass to a face-plate portion, but since it has a considerable coloring property, it is not preferable for use in a cathode-ray tube in which color is regarded as important, such as a color cathode-ray tube. Moreover, in the case of a cathode-ray tube having a high added value in itself such as a color cathode-ray tube, its recovery is also regarded as important, and when an epoxy resin is used, it has a high adhesive strength, so that the face-plate portion tends to be injured at the time of removing the front glass, therefore it is substantially impossible to peel off the glass.

Moreover, epoxy resin compositions have a higher viscosity than unsaturated polyester resin compositions and hence are disadvantageous in that foams sucked at the time of mixing with a curing agent or casting the resin are difficult to remove. Furthermore, since epoxy resins increase rapidly in viscosity immediately after being mixed with a curing agent, their period of usability at casting is very short, and for carrying out operations smoothly, special mixing and casting apparatus are needed; thus they are very poor in workability.

On the other hand, when an unsaturated polyester resin composition is used, its viscosity generally is as relatively low as several poises, so that its mixing with a curing agent and its casting into the gap between the face-plate portion of a cathode-ray tube and front glass are easy, and because of its low viscosity, it is advantageous, for example, in that it is easily defoamed at the time of mixing or casting. However, if the proportion of the curing agent of several percent based on the unsaturated polyester resin composition is different from the predetermined condition, distortion is locally caused at the time of curing. This cure distortion results in lens effect, so that when the cathode-ray tube is operated, a striped pattern, luminant spots and the like appear on a screen.

Since these striped pattern and luminant spots impare the value of the product, sufficient care should be taken in the mixing proportion of the curing agent.

The cure distortion is caused also by rapid heating or temperature unevenness of a curing oven, therefore temperature control and the like should be sufficiently carried out.

Unsaturated polyester resin compositions involve many problems in their production as described above, but they are advantageous in that they have a low viscosity and hence is easily defoamed, that they are hardly colored and hence excellent in transparency, and that the cathode-ray tube can be recovered relatively easily. However, they are disadvantageous in that since they are poor in adhesive strength, they peel off from the face-plate portion or the front glass portion when the cathode-ray tube is operated for a long period of time.

SUMMARY OF THE INVENTION

An object of this invention is to remove the surface defects, i.e., the defects in the prior art while making the most of the advantages of unsaturated polyester resins and provide a resin composition for treating cathode-ray tubes which has low viscosity and high transparency and adhesiveness and is free from occurrence of the surface defects due to distortion at the time of curing, etc.

This invention provides a resin composition for treating cathode-ray tubes obtained by adding 0.5 to 10 parts by weight of maleic anhydride to 100 parts by weight of an unsaturated polyester resin composition comprising (I) an unsaturated polyester obtained by reacting as an acid component an unsaturated dibasic acid and/or an acid anhydride thereof, and if necessary one or more other polybasic acids and/or acid anhydrides thereof, with an alcohol component and having a molecular weight of 500 to 8000 per unsaturated group in the polyester (II) a sytrene monomer and/or a derivative thereof, and (III) at least one polymerizable unsaturated compound selected from the group consisting of (i) acrylonitrile, itaconic acid and citraconic anhydride, (ii) monoesters of unsaturated dibasic acids and diesters of unsaturated dibasic acids, and (iii) acrylic acid, methacrylic acid and their derivatives, and the component (I) being dissolved in the components (II) and (III) in the range of $$(b)/\{(a)+(c)\} = 1/10 \text{ to } 10/1$$

wherein (a) is the number of unsaturated groups in the component (I); (b) is the number of unsaturated groups in the component (II); and (c) is the number of unsaturated groups in the component (III).

BRIEF DESCRIPTION OF THE DRAWING

The attached drawing is a sectional schematic illustration of an explosion-proof cathode-ray tube.

DESCRIPTION OF THE PREFERRED EMBODIMENTS

The unsaturated dibasic acid and/or an acid anhydride thereof used as the main constituent of the acid component for preparing the unsaturated polyester (I) includes maleic acid, fumaric acid, itaconic acid, citaraconic acid, maleic anhydride, etc. These may be used alone or as a mixture thereof.

The acid component can, if necessary, contain a polybasic acid. Examples of the polybasic acid include phthalic acid, phthalic anhydride, isophthalic acid, terephthalic acid, trimellitic acid, trimellitic anhydride, succinic acid, azelaic acid, adipic acid, sebacic acid, tetrahydrophthalic acid, tetrahydrophthalic anhydride, hexahydrophthalic acid, hexahydrophthalic anhydride, endomethylenetetrahydrophthalic anhydride, anthracenemaleic anhydride adduct, rosin-maleic anhydride adduct, Het Acid and anhydride thereof, chdlorinated polybasic acids such as tetrachlorophthalic acid, tetrachlorophthalic anhydride and the like, halogenated polybasic acids such as tetrabromophthalic acid, tetrabromophthalic anhydride, etc. These may be used as a mixture thereof.

Further, the acid component may also contain 3,6-endomethylene-1,2,3,6-tetrahydrophthalic anhydride or 3,6-endomethylene-1,2,3,6-tetrahydrophthalic acid.

3,6-Endomethylene-1,2,3,6-tetrahydrophthalic anhydride is obtained for example, by pyrolyzing dicyclopentadiene at 170° to 180° C. into cyclopentadiene, and subjecting it to Diels-Alder reaction with maleic anhydride at 20° to 40° C. for 2 hours. Such a compound is commercially available under the trade name of HIMIC anhydride manufactured by Hitachi Chemical Company, Ltd.

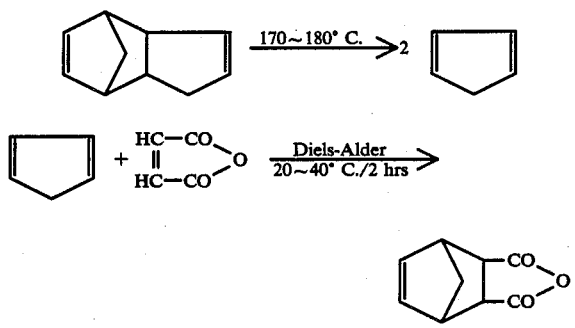

3,6-Endomethylene-1,2,3,6-tetrahydrophthalic acid is obtained by using maleic acid in place of the above maleic anhydride. These compounds are well known.

As the alcohol component, there can be used dihydric alcohols such as ethylene glycol, diethylene glycol, propylene glycol, dipropylene glycol, 1,3-butanediol, 1,4-butanediol, 2,3-butanediol, 1,5-pentanediol, 1,6-hexanediol, triethylene glycol, neopentyl glycol and the like; trihydric alcohols such as glycerin, trimethylolethane, trimethylolpropane and the like; tetrahydric alcohols such as pentaerythritol and the like; etc. There can also be used halogenated alcohols such as chlorides, bromides and the like of the various alcohols described above.

A process for producing the unsaturated polyester by reacting the aforesaid acid component with the aforesaid alcohol component is conducted mainly by condensation reaction and by elimination of low-molecular-weight compounds produced by the reaction of the two components such as water from the system.

As a reactor for carrying out this reaction, there is selected one which is inert toward the acid component, such as a reactor of glass, stainless steel or the like, and it is preferable to use a reactor equipped with a stirrer, a fractionating device for preventing the alcohol component from being distilled out azeotropy of water and the alcohol component, a heating device for raising the temperature of the reaction system, a temperature-controlling circuit for the heating device, and a device for introducing nitrogen gas or the like.

As to the reaction conditions, it is preferable to carry out the reaction at a temperature of 150° C. or higher at which the reaction rate is sufficiently high. For preventing coloring by oxidation reaction at high temperatures, a reaction temperature in the range of 160° C. to 210° C. is more preferable.

For preventing side reactins due to oxidation at high temperatures, it is preferable to carry out the synthesis while introducing an inert gas such as nitrogen, carbon dioxide or the like.

The reaction is allowed to proceed by heating the system composed of a mixture of the acid component and the alcohol component, and eliminating produced low-molecular-weight compounds such as condensation water from the system. The elimination is conducted preferably by spontaneous distilling-out by induction of an inert gas or distilling-out under reduced pressure. When the low-molecular-weight compounds to be distilled out have a high boiling point, a high vacuum is needed.

Further, for accelerating distilling-out of the low-molecular-weight compounds such as condensation water, it is also possible to add a solvent such as toluene, xylene or the like to the system to conduct spontaneous distilling-out.

The degree of progress of the reaction can be known generally by, for example, measuring the amount of a distillate produced by the reaction, quantitatively determining the terminal functional group, or measuring the viscosity of the reaction system.

The unsaturated polyester used in this invention has a molecular weight of 500 to 8000, preferably 1000 to 4000 per unsaturated group.

Such an unsaturated polyester can be produced by a well-known process by adjusting the mixing ratios of the starting materials.

When the molecular weight per mole of unsaturated group of the unsaturated polyester is less than 500, the crosslinking density of the resulting cured product of resin is increased. Accordingly, the shrinkage percentage of the resin is increased and the cured product of resin becomes inflexible, therefore peeling-off from the front glass or the face-plate portion is caused.

When the molecular weight per unsaturated group of the unsaturated polyester exceeds 8000, no sufficient crosslinking occurs at the time of curing the resin. Therefore, copolymerization of only the styrene monomer and/or a derivative thereof occurs, so that the cured resin becomes whitely turbid, and hence the cathode-ray tube cannot be used as an article of commerce. Further, since no sufficient crosslinking occurs, a lowering of adhesive strength to the front glass or the face-plate portion of cathode-ray tube is caused under the conditions of high temperature and humidity (85° C., 90% R.H.) and is responsible for peeling-off.

The styrene monomer and/or a derivative thereof (II) in which the unsaturated polyester (I) thus obtained is dissolved include styrene, chlorostyrene, dichlorostyrene, p-methylstyrene, α-methylstyrene, vinyltoluene, divinylbenzene, etc. These are used alone or in combination.

As the polymericable unsaturated compound (III), there is used at least one member selected from the group consisting of (i) acrylonitrile, itaconic acid and citraconic anhydride.

As the polymerizable unsaturated compound (III), there can also be used at least one compound selected from the group consisting of (ii) monoesters and diesters of unsaturated dibasic acids.

As the monoesters and diesters of unsaturated dibasic acids, there can be used, for example, various esters such as monomethyl fumarate, dimethyl fumarate, monomethyl maleate, dimethyl maleate, monoethyl fumarate, diethyl fumarate, monoethyl maleate, diethyl maleate, monopropyl fumarate, dipropyl fumarate, monopropyl maleate, dipropyl maleate, monobutyl fumarate, dibutyl fumarate, monooctyl fumarate, dioctyl fumarate, monomethyl itaconate, dimethyl itaconate, diethyl itaconate, monoethyl itaconate, monobutyl itaconate, dibutyl itaconate, monopropyl itaconate, dipropyl itaconate and the like.

These esters can be used alone or in combination.

As the polymerizable unsaturated compound (III), there can also be used at least one compound selected from the group consisting of (iii) acrylic acid, methacrylic acid and their derivatives.

As the derivatives of acrylic acid and methacrylic acid, there can be used, for example, allyl acrylate, benzyl acrylate, butyl acrylate, ethyl acrylate, methyl acrylate, propyl acrylate, hydroxyethyl acrylate, methyl methacrylate, ethyl methacrylate, butyl methacrylate, propyl methacrylate, allyl methacrylate, benzyl methacrylate, hydroxyethyl methacrylate, dodecyl methacrylate, octyl methacrylate, pentyl methacrylate, diethylene glycol dimethacrylate, diethylene glycol diacrylate, trimethylolpropane triacrylate, trimethylolpropane trimethacrylate, ethylene glycol dimethacrylate, ethylene glycol diacrylate, propylene glycol diacrylate, propylene glycol dimethacrylate, butanediol diacrylate, butanediol dimethacrylate, etc.

In this invention, when there are taken the number of unsaturated groups in the unsaturated polyester (I) as (a), that of unsaturated groups in the styrene monomer and/or a derivative thereof (II) as (b), and that of unsaturated groups in the polymerizable unsaturated compound (III) as (c), the unsaturated polyester is dissolved in the styrene monomer and/or a derivative thereof and the polymerizable unsaturated compound (III) in the range:

$(b)/\{(c)\} = 1/10-10/1.$

When the polymerizable unsaturated compound is (i), a range:

$(b)/\{(a)+8c)\} = 5/10-10/1$ is preferred.

When $(b)/\{(a)+(c)\}$ exceds 10/1, luminant spots are increased, resulting in an increase of fraction defective. When $(b)/\{(a)+(c)\}$ is less than 5/10, the viscosity is increased, resulting in a lowering of defoaming properties and great prolongation of curing, therefore the workability is greatly lowered, so that there is strengthened the tendency that surface defects due thereto such as foams, resin leakage, casting shortage and the like are caused.

In the case of the polymerizable unsaturated compound being (ii), when the ratio $(b)/\{(a)+(c)\}$ is more than 10/1, the mixing ratio of curing agent differs from a predetermined condition in curing the unsaturated polyester resin composition for the treatment, and cure distortion is easily caused by the unevenness of the temperature of curing oven at the time of curing and by the difference between the temperature of the unsaturated polyester resin composition containing the curing agent and the temperature of the front glass set of a cathode-ray tube into which said composition is to be casted. Therefore, a strped pattern or luminant spots appear on the screen, so that the commercial value is lost.

On the other hand, when the ratio $(b)/\{(a)+(c)\}$ is less than 1/10, the viscosity-lowering effect of the styrene monomer and/or a derivative thereof which have a low viscosity is lost, therefore the workability is lowered. For example, casting of the resin composition becomes very difficult, and defoaming at the time of mixing or casting a curing agent is deteriorated. The ratio $(b)/\{(a)+(c)\}$ is more preferably in the range of ½–5/1. In the case of above (ii), although the unsaturated polyester (I) may be dissolved in a mixture of the styrene monomer and/or a derivative thereof (II) and the monester and/or diester of an unsaturated dibasic acid, it is also possible to dissolve the unsaturated polyester in the styrene monomer and/or a derivative thereof previously and add thereto the monester and/or diester of an unsaturated dibasic acid. Further, it is also possible to dissolve the unsaturated polyester in the monoester and/or diester of an unsaturated dibasic acid and add thereto styrene and/or a derivative thereof.

In the case of above (iii), although the unsaturated polyester (I) maya be dissolved in a mixture of styrene and/or a derivative thereof (II) and acrylic acid, methacrylic acid or a derivative thereof, it is also possible to dissolve the unsaturated polyester in styrene and/or a derivative thereof prevously and add thereto acrylic acid, methacrylic acid or a derivative thereof. Further, it is also possible to dissolve the unsaturated polyester in acrylic acid, methacrylic acid or a derivative thereof and add thereto styrene and/or a derivative thereof.

The unsaturated polyester resin composition thus prepared may, if necessary, contain polymerization inhibitors such as hydroquinone, pyrocatechol, 2,6-di-tert-butylparacresol, p-benzoquinone, di-t-butylcatechol, hydroquinone monomethyl ether, t-butylcatecol, mono-t-butylhydroquinone and the like. Although the amount of the polymerization inhibitor added is not critical, it is preferably 0 to 0.03 part by weight per 100 parts by weight of the unsaturated polyester composition.

Organic peroxides used for curing the resin composition of this invention include, for example, methyl ethyl ketone peroxide, cyclohexanone peroxide, cumene hydroperoxide, dicumyl peroxide, acetylacetone peroxide, benzoyl peroxide, lauroyl peroxide, cumene peroxide, etc. These compounds may be used alone or in combination. Although the amount of the organic peroxide added is not critical, it is preferably 0.1 to 2 parts by weight per 100 parts by weight of the unsaturated polyester resin composition. Further, if necessary, a cure accelerator can be used.

The resin composition for treating cathode-ray tubes is obtained by adding 0.5 to 10 parts by weight of maleic anhydride to 100 parts by weight of the unsaturated polyester resin composition described above.

When the amount of maleic anhydride is less than 0.5 part by weight, improvement of the adhesion to glass, namely, the effect of the addition of maleic anhydride cannot be attained. When it exceeds 10 parts by weight, the cured product becomes too hard, so that recovery of the cathode-ray tube becomes impossible, and a part of the maleic anhydride crystallizes, resulting in appearance of luminant spots.

Maleic anhydride may be previously heated to about 54° to about 60° C. to be liquefied and then added to the unsaturated polyester resin composition, or alternatively maleic anhydride may be added to the unsaturated polyester resin composition and then heated to about 54° to about 60° C. to be dissolved.

The thus prepared resin composition for treating cathode-ray tubes is, if necessary, incorporated with a polymerization inhibitor such as hydroquinone, pyrocatechol, 2,6-di-tert-butylparacresol or the like, after which it can be cured by using an organic peroxide catalyst such as methyl ethyl ketone peroxide, benzoyl peroxide, cumene hydroperoxide, lauroyl peroxide or the like.

These organic peroxide catalysts can be used in combination with cure accelerators, for example, metallic soaps such as cobalt naphthenate, cobalt octenoate and the like; quaternary ammonium salts such as dimethylbenzylammonium chloride and the like; $\beta$-diketones such as acetylacetone and the like; amines such as dimethylaniline, N-ethyl-metatoluidine, triethanolamine and the like; etc.

The resin composition of this invention can also be light-cured by using as a photopolymerization initiator, for example, diphenyl disulfide, benzoin, benzoin methyl ether, benzoin ethyl ether, benzoin n-propyl ether, benzoin isopropyl ether, benzoin sec-butyl ether, benzoin-2-pentyl ether, benzoin cyclohexyl ether, dimethylbenzyl ketal or the like.

The above-mentioned organic peroxides and these photopolymerization initiators may be simultaneously used.

Further, the resin composition may, if necessary, contain dyes, plasticizers, ultraviolet ray absorbing agents, and the like.

The resin composition for treating cathode-ray tubes is casted into the gap between the front glass and faceplate portion of a cathode-ray tube such as a Braun tube of television, a display tube for computer or the like and cured.

This invention is illustrated by way of the following Examples, in which all parts are by weight unless otherwise specified.

EXAMPLES 1 TO 9

Into a 3-liter four-necked flask equipped with a stirring rod, condenser, nitrogen gas inlet tube and thermometer were charged the following ingredients:

| | |
|---|---|
| diethylene glycol | 1,166 parts |
| adipic acid | 584 parts |
| phthalic anhydride | 740 parts |
| fumaric acid | 116 parts. |

While introducing nitrogen gas slowly into the flask, the temperature was raised to 150° C. over a period of 1.5 hours by using a mantle heater. Further, the temperature was raised to 200° C. over a period of 4 hours and maintained at this temperature. An unsaturated polyester (A) having an acid value of 34 was obtained in about 10 hours. Further, the temperature was lowered to 100° C., and 1 part of hydroquinone was added as a polymerization inhibitor, after which the unsaturate polyester (A) incorporated with hydroquinone was poured into a stainless-steel vat and allowed to stand to be cooled to room temperature. The unsaturated polyester (A) thus obtained had a molecular weight of 2440 per unsaturated group.

This unsaturated polyester (A) was dissolved in a mixed solution of styrene and a polymerizable unsaturated compound according to the recipes shown in Table 1 to obtain unsaturated polyester resin compositions.

Maleic anhydride which was solid at ordinary temperatures was added to the unsaturated polyester resin compositions according to the recipes shown in Table 1, and the resulting mixtures were heated to 57° C. to dissolve maleic anhydride, whereby homogeneous unsaturated polyester resin compositions for treating cathode-ray tubes were obtained.

To each of the resin compositions thus obtained were added 0.025 part of cobalt octenoate (manufactured by Dainippon Ink and Chemicals, Inc., metal content 6% by weight) and 1 part of methyl ethyl ketone peroxide (manufactured by Nippon Oils and Fats Co., Ltd.).

On the other hand, on a 3 mm (thickness)×250 mm×250 mm, transparent, flat glass plate was placed, as a spacer, a silicone plate prepared by cutting the inner part in a size of 240 mm×240 mm out of a 3 mm (thickness)×250 mm×250 mm silicone plate with a razor so as to leave the peripheral part, and then providing a slit inlet in one place in the remaining peripheral part. A 3 mm (thickness)×250 mm×250 mm, transparent, flat glass plate was placed on the spacer, and the two glass plates were fastened to each other with clamps to obtain a casting mold. The unsaturated polyester resin composition described above was poured through the slit inlet of the spacer in the casting mold.

Thereafter, the casting mold was allowed to stand in an electric oven at 80° C. for 90 minutes to cure the resin, whereby an unsaturated polyester resin casted plate was obtained.

Characteristics of the casted plates thus obtained are shown in Table 1.

As Comparative Examples 1 and 2, compositions were prepared according to the recipes shown in Table 1 by using the aforesaid unsaturated polyester (A) in Examples 1 to 9, and characteristics of casted plates were evaluated in the same manner as described above.

In the case of Examples 1 to 9, no cure distortion occurred at the time of curing, and neither striped pattern nor luminant spot was observed. However, in the case of Comparative Examples 1 and 2, neither striped pattern nor luminant spot was observed, but when the casted plates were allowed to stand in an electric oven at 150° C. for 96 hours, peeling-off occurred: thus Comparative Examples 1 and 2 were inferior to Examples 1 to 9 in adhesive strength.

TABLE 1

| | | | Example | | | | | | | | | Comparative Example | |
|---|---|---|---|---|---|---|---|---|---|---|---|---|---|
| | | | 1 | 2 | 3 | 4 | 5 | 6 | 7 | 8 | 9 | 1 | 2 |
| Recipe (parts) | (a) | Unsaturated polyester (A) | 100 (0.04) | 100 (0.04) | 100 (0.04) | 100 (0.04) | 100 (0.04) | 100 (0.04) | 100 (0.04) | 100 (0.04) | 100 (0.04) | 100 (0.04) | 100 (0.04) |
| | (b) | Styrene | 25 (0.24) | 25 (0.24) | 30 (0.29) | 25 (0.24) | 5 (0.05) | 23 (0.22) | 24 (0.23) | 24 (0.23) | 18 (0.17) | 25 (0.24) | 25 (0.24) |
| | | Dibutyl fumarate | 15 (0.06) | 7.5 (0.03) | — | — | — | — | — | — | — | 15 (0.06) | — |
| | | Methyl methacrylate | — | — | 5 (0.05) | 15 (0.15) | 30 (0.05) | — | — | — | — | — | 5 (0.05) |
| | (c) | Acrylonitrile | — | — | — | — | — | 7 (0.13) | — | — | 10 (0.19) | — | — |
| | | Itaconic acid | — | — | — | — | — | — | 5 (0.04) | — | — | — | — |
| | | Citraconic anhydride | — | — | — | — | — | — | — | — | 5 (0.05) | — | — |
| | | Maleic anhydride | 3 | 3 | 3 | 3 | 3 | 3 | 3 | 3 | 3 | — | — |
| | (b)/{(a) + (c)} | | 2.4 | 3.4 | 3.2 | 1.3 | 0.15 | 1.2 | 2.6 | 2.3 | 0.7 | 2.4 | 3.2 |
| Cure distortion | Striped pattern | | None | None | None | None | None | None | None | None | None | None | None |
| | Luminant spot | | None | None | None | None | None | None | None | None | None | None | None |
| Peeling-off | Initial stage | | None | None | None | None | None | None | None | None | None | None | None |
| | After 150° C./96 hrs | | None | None | None | None | None | None | None | None | None | About 10% | About 7% |
| Adhesive strength (kg/cm²) | | | 24 | 28 | 25 | 22 | 21 | 26 | 24 | 29 | 27 | 13 | 16 |

Note:
The figures in the parentheses are the number of unsaturated groups.

In Table 1 (the same applied to Table 2), cure distortion was visually observed: the existence of a striped pattern was invertigated, and the number of luminant spots was reckoned. Peeling-off was also visually observed, and whether it occurred or not and the area which it covered are shown.

The adhesive strength is shown in terms of a value obtained by placing two 10 mm (thickness)×40 mm×'mm glass plates one upon another in imperfect accord so as to adjust the contacted area to 20 mm×°mm, adhering them to each other with the unsaturated polyester resin composition (curing conditions: methyl ethyl ketone peroxide 1% by weight, curing at 80° C. for 5 hours), holding the resulting assembly between spacers on both sides, applying a compression load thereto from above and below, and dividing a shearing force at which the adhesion surface was fractured, by the adhered area.

EXAMPLES 10, 11 AND 12

Into a 3-liter four-necked flask equipped with the same devices as in Example 1 were charged the following ingredients:

| dipropylene glycol | 1,474 parts |
|---|---|
| adipic acid | 1,241 parts |
| maleic anhydride | 147 parts |

While introducing nitrogen gas slowly into the flask, the temperature was raised to 150° C. over a period of 1 hour by using a mantle heater. Further, the temperature was raised to 200° C. over a period of 4 hours and maintained at this temperature. After about 12 hours, an unsaturated polyester (B) having an acid value of 25 was obtained.

Further, the temperature was lowered to 100° C., and 1 part of hydroquinone was added as a polymerization inhibitor, after which the unsaturated polyester (B) incorporated with hydroquinone was poured into a stainless-steel vat and allowed to stand to be cooled to room temperature.

The unsaturated polyester (B) thus obtained had a molecular weight of 1710 per unsaturated group.

This unsaturated polyester was dissolved in a mixed solution of styrene and diethyl fumarate according to the recipes shown in Table 2, after which maleic anhydride which had previously been liquefied by heating was added to the resulting solutions to obtain unsaturated polyester resin compositions.

Characteristics of casted plates obtained by curing each of the unsaturated polyester resin compositions in the same manner as in Examples 1 to 9 are shown in Table 2.

In Examples 10, 11 and 12, no cure distortion was observed.

TABLE 2

| | | Example 10 | Example 11 | Example 12 |
|---|---|---|---|---|
| Recipe | Unsaturated polyester B (a) | 100 parts (0.06) | 100 parts (0.06) | 100 parts (0.06) |
| | Styrene (b) | 25 parts (0.24) | 20 parts (0.19) | 15 parts (0.14) |
| | Diethyl fumarate (c) | 5 parts (0.03) | 10 parts (0.07) | 15 parts (0.10) |
| | (b)/{(a) + (c)} | 2.7 | 1.5 | 0.9 |
| | Maleic anhydride | 5 parts | 5 parts | 5 parts |
| Cure distortion | Striped pattern | None | None | None |
| | Luminant spot | None | None | None |
| Peeling-off | Initial stage | None | None | None |
| | After 150° C./96 hrs | None | None | None |
| Adhesive strength (kg/cm²) | | 30 | 21 | 14 |

Note:
The figures in the parentheses are the number of unsaturated groups.

EXAMPLE 13

Into a 3-liter four-necked flask equipped with a stirring rod, condenser, nitrogen gas inlet tube and thermometer were charged the following ingredients:

| | |
|---|---|
| maleic anhydride | 147 parts |
| 3,6-endomethylene-1,2,3,6-tetrahydrophthalic anhydride (HIMIC anhydride, a trade name, mfd. by Hitachi Chemical Company, Ltd.) | 1,394 parts |
| diethylene glycol | 1,166 parts |

While introducing nitrogen gas slowly into the flask, the temperature was raised to 150° C. over a period of 1.5 hours by using a mantle heater. Further, the temperature was raised to 200° C. over a period of 4 hours and maintained at this temperature. After about 10 hours, an unsaturated polyester (C) having an acid value of 24 was obtained. The unsaturated polyester (C) obtained had a molecular weight of 1680 per unsaturated group.

In 100 parts of the unsaturated polyester (C) were dissolved 25 parts of styrene, 8 parts of diethyl fumarate and 0.01 part of hydroquinone as a polymerization inhibitor. Further, 0.05 part of cobalt naphthenate (manufactured by Dainippon Ink and Chemicals, Inc., metal content 6% by weight) and 6 parts of liquid maleic anhydride heated to 60° C. were dissolved therein to obtain a resin composition for treating cathode-ray tubes which had a viscosity of 3.9 poises (25° C., Gardner-Holdt bubble viscometer).

On a 3 mm (thickness)×250 mm×250 mm transparent glass plate was placed, as a spacer, a silicone plate prepared by cutting the inner part in a size of 240 mm×240 mm out of a 3 mm (thickness)×250 mm×250 mm silicone plate with a razor so as to leave the peripheral part, and then providing a slit inlet in one place in the remaining peripheral part. A 3 mm (thickness)×250 mm×250 mm, transparent, flat glass plate was placed on the spacer, and the two glass plates were fastened to each other with clamps to produce a casting mold. An unsaturated polyester resin composition prepared by adding 1 part of methyl ethyl ketone peroxide (a mixture of 55% by weight of methyl ethyl ketone peroxide and 45% by weight of dimethyl phthalate, manufactured by Nippon Oils and Fats Co., Ltd.) to 100 parts of the unsaturated polyester resin composition was poured through the slit inlet of the spacer in the casting mold. Thereafter, the casting mold was allowed to stand in an electric oven at 80° C. for 60 minutes to cure the resin, whereby an unsaturated polyester resin casted plate was obtained.

After cooling, whether a striped pattern or luminant spots due to cure distortion existed or not was visually judged. Peeling-off was also visually observed, and whether it occurred or not and the area which it covered are shown. The casting mold was then allowed to stand in an electric oven at 150° C. for 96 hours, and after cooling, peeling-off was observed.

The adhesive strength is shown in terms of a value obtained by placing two 10 mm (thickness)×40 mm×40 mm glass plates one upon another in imperfect accord so as to adjust the contacted area to 20 mm×20 mm, adhering them to each other with the unsaturated polyester resin composition (curing conditions: methyl ethyl ketone peroxide 1% by weight, curing at 80° C. for 5 hours), holding the resulting assembly between spacers on both sides, applying a compression load thereto from above and below, and dividing a shearing force at which the adhesion surface was fractured, by the adhered area.

The recipe and characteristics such as cure distortion and the like are shown in Table 3.

EXAMPLE 14

In 100 parts of the unsaturated polyester resin (C) obtained in Example 13 were dissolved 25 parts of styrene, 10 parts of monomethyl maleate and 0.01 part of hydroquinone. Further, 0.05 part of cobalt naphthenate (metal content 6% by weight) and 5 parts of liquid maleic anhydride heated to 60° C. were dissolved therein to obtain an unsaturated polyester resin composition having a viscosity of 2.3 poises (25° C., Gardner-Holdt bubble viscometer). The resin composition was cured in the same manner as in Example 13. The results are shown in Table 3.

EXAMPLE 15

Into the same apparatus as in Example 13 were charged the following ingredients:

| | |
|---|---|
| fumaric acid | 116 parts |
| 3,6-endomethylene-1,2,3,6-tetrahydrophthalic acid | 1,274 parts |
| adipic acid | 29 parts |
| dipropylene glycol | 1,541 parts. |

They were reacted by the same synthesis process as in Example 13, and the temperature was maintained at 200° C. After about 12 hours, an unsaturated polyester (D) having an acid value of 20 was obtained. The unsaturated polyester (D) obtained had a molecular weight of 2860 per unsaturated group.

In 100 parts of the unsaturated polyester (D) were dissolved 25 parts of styrene, 8 parts of diethyl fumarate and 0.025 part of t-butylcatechol. Further, 0.05 part of cobalt octenoate (manufactured by Dainippon Ink and Chemicals, Inc., metal content 6% by weight) and 3 parts of liquid maleic anhydride heated to 60° C. were dissolved therein to obtain a resin composition for treating cathode-ray tubes which had a viscosity of 3.3 poises (25° C., Gardner-Holdt bubble viscometer).

This resin composition was cured and then tested for characteristics both in the same manner as in Example 13. The recipe and characteristics such as cure distortion and the like are shown in Table 3.

COMPARATIVE EXAMPLES 3 TO 5

Compositions were prepared in the same manner as with the unsaturated polyester resin compositions obtained in Examples 13 to 15 respectively, except that no maleic anhydride was added. The compositions thus prepared were cured and then tested for characteristics both in the same manner as in Example 13. The recipes and characteristics such as cure distortion are shown in Table 3.

COMPARATIVE EXAMPLE 6

Into the same apparatus as in Example 6 were charged the following ingredients:

| | |
|---|---|
| maleic anhydride | 588 parts |
| 3,6-endomethylene-1,2,3,6-tetrahydrophthalic anhydride | 656 parts |

-continued

| | |
|---|---|
| (mfd. by Hitachi Chemical Company, Ltd.) | |
| diethylene glycol | 1,166 parts. |

They were reacted by the same synthesis process as in Example 6, and the temperature was maintained at 200° C. After about 8 hours, an unsaturated polyester (E) having an acid value of 29 was obtained. The unsaturated polyester (E) obtained had a molecular weight of 370 per unsaturated group.

In 100 parts of the unsaturated polyester (E) were dissolved 25 parts of styrene, 8 parts of diethyl fumarate and 0.01 part of hydroquinone. Further, 0.05 part of cobalt naphthenate (metal content 6% by weight) and 6 parts of liquid maleic anhydride heated to 60° C. were dissolved therein to obtain an unsaturated polyester resin composition having a viscosity of 8.3 poises (25° C., Gardner-Holdt bubble viscometer), which was then cured in the same manner as in Example 13. Its characteristics were evaluated. The recipe and characteristics such as cure distortion are shown in Table 3.

TABLE 3

| | | | Example 13 (C) | Example 14 (C) |
|---|---|---|---|---|
| Recipe | Unsaturated polyester | | 100 parts | 100 parts |
| | Styrene monomer and/or a derivative thereof | Styrene | 25 parts | 25 parts |
| | Monoester and/or diester of unsaturated dibasic acid | Diethyl fumarate | 8 parts | — |
| | | Monomethyl maleate | — | 10 parts |
| | (a) | | 0.06 | 0.06 |
| | (b) | | 0.24 | 0.24 |
| | (c) | | 0.05 | 0.08 |
| | (b)/{(a) + (c)} | | 2.2 | 1.7 |
| | Maleic anhydride | | 6 parts | 5 parts |
| Cure distortion | Striped pattern | | None | None |
| | Luminant spot | | None | None |
| Peeling-off | Initial stage | | None | None |
| | After 150° C./96 hrs | | None | None |
| Adhesive strength (kg/cm²) | | | 31 | 29 |

| Example 15 (D) | Comparative Example 3 (C) | Comparative Example 4 (C) | Comparative Example 5 (D) | Comparative Example 6 (E) |
|---|---|---|---|---|
| 100 parts | 100 parts | 100 parts | 100 parts | 100 parts |
| 25 parts | 25 parts | 25 parts | 25 parts | 25 parts |
| 8 parts | 8 parts | — | 8 parts | 8 parts |
| — | — | 10 parts | — | — |
| 0.03 | 0.06 | 0.06 | 0.03 | 0.27 |
| 0.24 | 0.24 | 0.24 | 0.24 | 0.24 |
| 0.05 | 0.05 | 0.08 | 0.05 | 0.05 |
| 3 | 2.2 | 1.7 | 3 | 0.8 |
| 3 parts | — | — | — | 6 parts |
| None | None | None | None | None |
| None | None | None | None | None |
| None | None | None | None | None |
| None | About 5% | About 5% | About 5% | About 20% |
| 27 | 14 | 16 | 15 | 93 |

The resin composition for treating cathode-ray tubes of this invention is characterized in that it can greatly reduce cure distortion which occurs in conventional resin compositions, that it forms no crack, and that it is so excellent in adhesiveness to glass plates that it causes no peeling-off.

What is claimed is:

1. A cathode-ray tube obtained by casting a resin composition for treating cathode-ray tubes exhibiting excellent adhesive strength and freedom from cure distortion into a gap between a front glass and a face-plate portion of a cathode-ray tube and curing the resin composition, said resin composition comprising:
  0.5 to 10 parts by weight of maleic anhydride admixed with
  100 parts by weight of an unsaturated polyester resin composition comprising
  (I) an unsaturated polyester obtained by reacting an acid component comprising as an essential constituent at least one member selected from the group consisting of an unsaturated dibasic acid and an acid anhydride thereof, with an alcohol component and having a molecular weight of 500 to 8,000 per unsaturated group,
  (II) at least one member selected from the group consisting of a styrene monomer and a derivative thereof, and
  (III) at least one polymerizable unsaturated compound selected from the group consisting of
    (i) acrylonitrile, itaconic acid and citraconic anhydride,
    (ii) a monoester and a diester of unsaturated diabasic acid, and
    (iii) acrylic acid, methacrylic acid and a derivative thereof;
  the component (I) being dissolved in the components (II) and (III) in the range of $$(b)/\{(a)+(c)\} = 1/10 \text{ to } 10/1,$$

wherein (a) is the number of unsaturated groups in the component (I); (b) is the number of unsaturated groups in the component (II); and (c) is the number of unsaturated groups in the component (III).

2. A cathode ray tube according to claim 1, wherein the acid component is an unsaturated dibasic acid and an acid anhydride thereof.

3. A cathode-ray tube according to claim 1, wherein the acid component is an unsaturated dibasic acid or an acid anhydride thereof and one or more other polybasic acids.

4. A cathode-ray tube according to claim 1, wherein the polybasic acid is 3,6-endomethylene-1,2,3,6-tetrahydrophthalic acid.

5. A cathode-ray tube according to claim 1, wherein the polymerizable unsaturated compound is at least one member selected from the group consisting of acrylonitrile, itaconic acid and citraconic anhydride.

6. A cathode-ray tube according to claim 1, wherein the acid component for preparing the unsaturated polyester is at least one member selected from the group consisting of an unsaturated dibasic acid and acid anhydride thereof and one or more polybasic acids, and the polymerizable unsaturated compound is at least one member selected from the group consisting of acrylonitrile, itaconic acid and citraconic anhydride.

7. A cathode-ray tube according to claim 1, wherein the acid component for preparing the unsaturated polyester is at least one member selected from the group consisting of an unsaturated dibasic acid and an acid anhydride thereof and 3,6-endomethylene-1,2,3,6-terahydrophthalic anhydride or 3,6-endomethylene-1,2,3,6-tetrahydrophthalic acid, and the polymerizable unsaturated compound is at least one member selected from the group consisting of a monoester and a diester of an unsaturated dibasic acid.

8. A cathode-ray tube according to claim 1, wherein the polymerizable unsaturated compound is at least one member selected from the group consisting of a monoester and a diester of an unsaturated dibasic acid.

9. A cathode-ray tube according to claim 1, wherein the acid component for preparing the unsaturated polyester is at least one member selected from the group consisting of an unsaturated dibasic acid and an acid anhydride thereof and one or more polybasic acids, and a polymerizable unsaturated compound is at least one member selected from the group consisting of a monoester and a diester of an unsaturated dibasic acid.

10. A cathode-ray tube according to claim 1, wherein the polymerizable unsaturated compound is at least one member selected from the group consisting of acrylic acid, methacrylic acid and a derivative thereof.

11. A cathode-ray tube according to claim 1, wherein the acid component comprises as its essential constitutent at least one member selected from the group consisting of an unsaturated dibasic acid and an acid anhydride thereof and at least one of another polybasic acid and an acid anhydride thereof.

12. A cathode-ray tube according to claim 1, wherein the unsaturated dibasic acid is selected from the group consisting of maleic acid, fumaric acid, itaconic acid and citraconic acid.

* * * * *